United States Patent [19]

Ueda

[11] Patent Number: 4,680,660
[45] Date of Patent: Jul. 14, 1987

[54] GUIDE GROOVE FOR A GUARD PANEL ON A MAGNETIC TAPE CASSETTE

[75] Inventor: Masaki Ueda, Odawara, Japan

[73] Assignee: Fuji Photo Film Co., Ltd., Japan

[21] Appl. No.: 815,950

[22] Filed: Jan. 3, 1986

[30] Foreign Application Priority Data

Jan. 7, 1985 [JP] Japan .................................. 60-364[U]

[51] Int. Cl.⁴ .............................................. G11B 23/02
[52] U.S. Cl. ..................................... 360/132; 242/199
[58] Field of Search .................. 360/132, 96.6, 93; 242/197–199

[56] References Cited

U.S. PATENT DOCUMENTS

| | | | |
|---|---|---|---|
| 4,418,373 | 11/1983 | Fujimori et al. | 360/132 |
| 4,556,153 | 12/1985 | Takagi et al. | 360/132 |
| 4,607,308 | 8/1986 | Tsuruta et al. | 360/132 |

Primary Examiner—Stuart N. Hecker
Assistant Examiner—David J. Severin
Attorney, Agent, or Firm—Pasquale A. Razzano

[57] ABSTRACT

A magnetic tape cassette comprises upper and lower case halves for housing a magnetic tape therein, and a guard panel swingably supported to cover the magnetic tape exposed at an aperture section formed at the front face of the case. The guard panel comprises an outer cover for covering the outer surface of the magnetic tape, and an inner cover having a guide boss on each of two side wall surfaces and supported on the outer cover for movement in synchronization with opening and closing of the outer cover to cover the inner surface of the magnetic tape when the outer cover is closed. The lower half is provided with an inner cover open/close guide groove formed for slide engagement with the guide boss and extending approximately vertically at each of inner wall sections of tape pull-out holes formed at opposite ends of the apertures section. The upper half is provided with an auxiliary guide rib formed as a guide wall extending upwardly from an upper end of a front side edge of the open/close guide groove when the upper half is combined with the lower half to constitute the case.

1 Claim, 3 Drawing Figures

GUIDE GROOVE FOR A GUARD PANEL ON A MAGNETIC TAPE CASSETTE

BACKGROUND OF THE INVENTION

1. Field of the Invention

This invention relates to a magnetic tape cassette provided with a guard panel. This invention particularly relates to an improvement in the inner cover guide configuration of a magnetic tape cassette provided with a guard panel of a dual configuration.

2. Description of the Prior Art

In general, magnetic video tape cassettes are provided with a guard panel for covering a magnetic tape exposed at the front face of the cassette body. Particularly, as the guard panel in a magnetic tape cassette for a small video tape recorders, such as an 8 mm video tape recorder, there has heretofore been known a guard panel comprising an outer cover for covering the outer surface of the magnetic tape, and an inner cover supported on the outer cover for movement in synchronization with opening/closing of the outer cover and covering the inner surface of the magnetic tape when the outer cover is closed.

When the guard panel is combined with the upper and lower halves of the cassette case during the assembling process of the magnetic tape cassette provided with the aforesaid guard panel, the guard panel is first mounted on the upper half which has been superposed on the lower half, and then the lower half is combined with the guard panel. However, after the guard panel is mounted on the upper half, the guard panel readily disengages from the upper half, and it is not always possible to combine the lower half with the guard panel.

Specifically, the upper half is provided with engagement holes for supporting the outer cover of the guard panel, and the lower half is provided with guide grooves for guiding the inner cover. When the guard panel is opened or closed, the inner cover is opened or closed with respect to the outer cover. Therefore, when the lower half is combined with the guard panel, supporting of the outer cover by the upper half is maintained, and at the same time the inner cover (i.e. guide bosses thereof) must be fitted to the guide grooves of the lower half. At this time, the outer cover readily disengages from the upper half. This is presumably because the engagement holes of the upper half for supporting shafts of the outer cover are semicircular and form complete circular holes when combined with semicircular holes of the lower half. Therefore, the rejection rate increases when the upper and lower halves are subjected to vibration during the assembling process or the assembling speed is increased. Thus a very real problem arises in the assembling process.

SUMMARY OF THE INVENTION

The primary object of the present invention is to provide a magnetic tape cassette provided with a guard panel comprising an inner cover and an outer cover, wherein the guard panel can be securely and quickly mounted on the cassette body in the assembling process.

Another object of the present invention is to provide a magnetic tape cassette provided with a guard panel comprising an inner cover and an outer cover, wherein the guard panel does not readily disengage from the upper half of the cassette body during the assembling process.

The present invention provides a magnetic tape cassette comprising upper and lower case halves for housing a magnetic tape therein, and a guard panel swingably supported to cover the magnetic tape exposed at an aperture section formed at the front face of the case constituted by the upper and lower case halves, wherein said guard panel comprises an outer cover for covering the outer surface of said magnetic tape, and an inner cover having a guide boss on each of two side wall surfaces and supported on said outer cover for movement in synchronization with opening and closing of said outer cover to cover the inner surface of said magnetic tape when said outer cover is closed, said lower half is provided with an inner cover open/close guide groove formed for slide engagement with said guide boss and extending approximately vertically at each of inner wall sections of tape pull-out holes formed at opposite ends of said aperture section, and said upper half is provided with an auxiliary guide rib formed as a guide wall extending upwardly from an upper end of a front side edge of said open/close guide groove when said upper half is combined with said lower half to constitute said case.

In the magnetic tape cassette of the present invention, the upper half is provided with the auxiliary guide ribs each of which continues upwardly from the upper end of front side edge of each inner cover open/close guide groove of the lower half when the upper and lower halves are combined together. The auxiliary guide ribs are used as guide walls for the guide bosses of the inner cover of the guard panel. Therefore, both the outer cover and the inner cover of the guard panel are mounted on the upper half and do not disengage from the upper half even when they are subjected to vibration. Thus it is possible to combine the lower half with the guard panel securely and easily. Specifically, when the guard panel is mounted on the cassette case during the cassette assembling process, it is possible to first mount the guard panel on the upper half by restricting the positions of the guide bosses of the inner cover of the guard panel by the auxiliary guide ribs, and then to combine the lower half with the upper half and guide the guide bosses along the auxiliary guide ribs into the inner cover open/close guide grooves of the lower half.

DESCRIPTION OF THE PREFERRED EMBODIMENTS

The present invention will hereinbelow be described in further detail with reference to the accompanying drawings.

Figure 1:
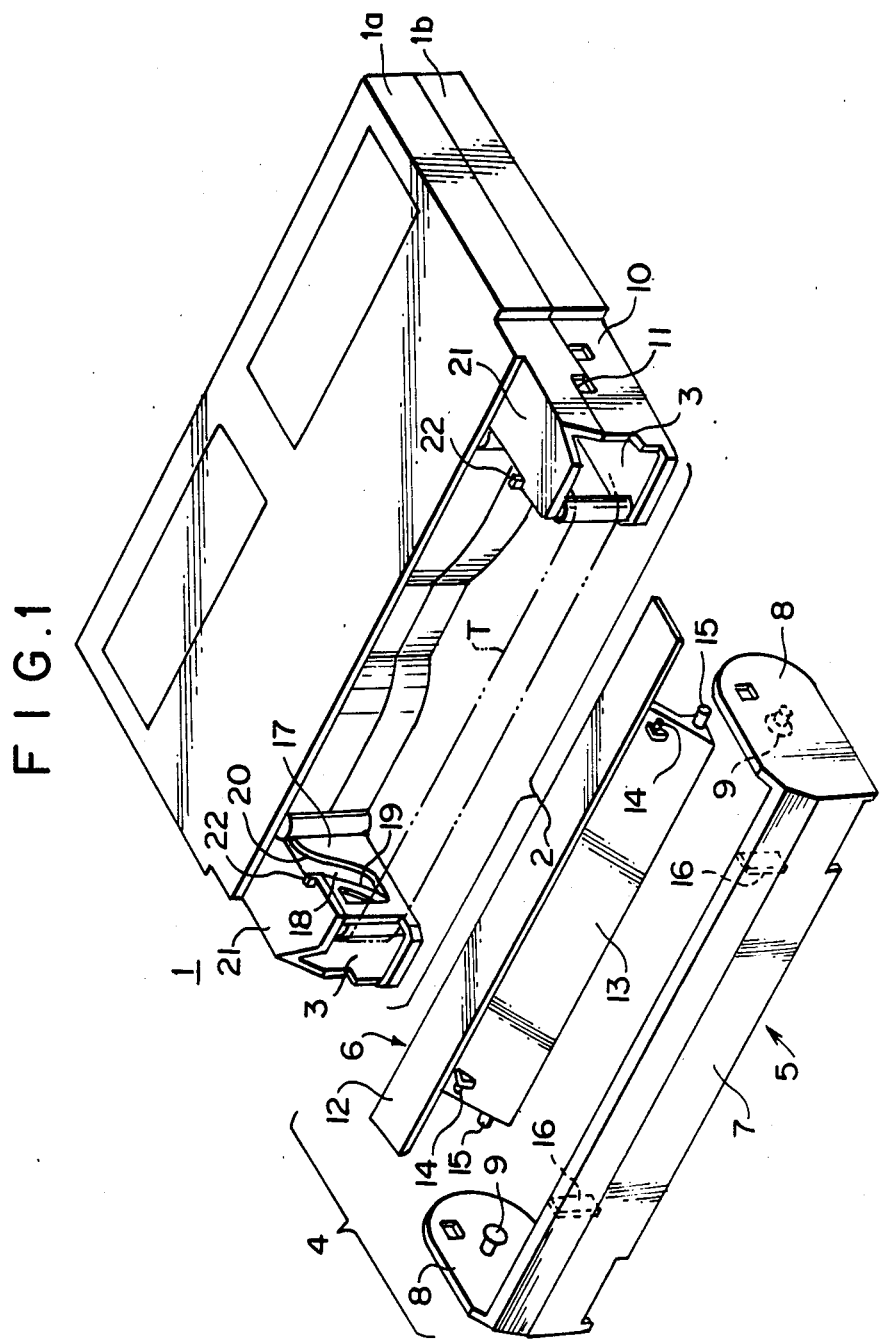
FIG. 1 is an exploded perspective view showing an embodiment of the magnetic tape cassette in accordance with the present invention.

In FIG. 1, a magnetic tape T housed in a cassette 1 is exposed between tape pull-out holes 3, 3 positioned at opposite ends of a front aperture section 2 of the cassette 1. A guard panel 4 for covering the aperture section 2 is of a dual configuration comprising an approximately U-shaped outer cover 5 and an inner cover 6 having an approximately T-shaped cross-section. The guard panel 4 is rotatably mounted on side faces of the cassette 1 and is normally urged in the closing direction by spring members (not shown).

The outer cover 5 is constituted by a front wall 7 positioned to cover a magnetic surface (outer surface) of the magnetic tape T, and a pair of side walls 8, 8 extending rearwardly of and normal to two ends of the front wall 7.

Supporting shafts 9, 9 are projected from inner surfaces of the side walls 8, 8 and are fitted to circular holes 11, 11 (only one thereof is shown) of outer side walls 10, 10 (only one thereof is shown) of the cassette 1 in the vicinity of the tape pull-out holes 3, 3 to swingably support the outer cover 5.

Each of the circular holes 11, 11 is formed by cutting the side walls of the upper half 1a and the lower half 1b respectively to a semicircular shape around the parting plane between the upper half 1a and lower half 1b.

The inner cover 6 is constituted by an upper wall 12 for covering the upper side of the aperture section 2, and a leg wall 13 inclined towards the front wall 7 of the outer cover 5 to cover the base surface (inner surface) of the magnetic tape T. The leg wall 13 is formed integrally with the rear side of the upper wall 12 so as to have an approximately T-shaped cross-section. The leg wall 13 is provided with short shafts 14, 14 at approximately middle height portions near the opposite ends of the surface facing the front wall 7, and with guide bosses 15, 15 at lower end portions of side faces adjacent the surface provided with the short shafts 14, 14.

The short shafts 14, 14 projecting laterally near the opposite ends of the surface of the leg wall 13 of the inner cover 6 are supported by a pair of ribs 16, 16 projecting inwardly of the front wall 7 of the outer cover 5. The guide bosses 15, 15 projecting from side faces of the leg wall 13 are slidably engaged with open/close guide grooves 18, 18 (only one thereof is shown) in inner wall surfaces 17, 17 (only one thereof is shown) of the cassette 1 which form the tape pull-out holes 3.

Figure 3:
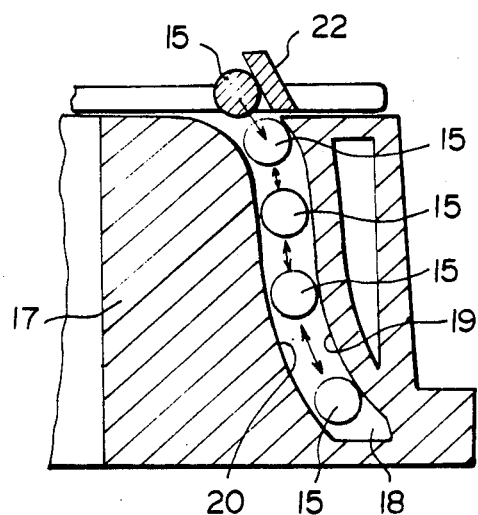

A front side wall 19 and a rear side wall 20 of each of the open/close guide grooves 18, 18 are gently curved, and each of approximately flat auxiliary guide ribs 22, 22 is formed on the extension of the front side wall 19 of the upper half 1a so as to project from each of upper surfaces 21, 21 of the upper half 1a. The auxiliary guide rib 22 is shown in detail in FIG. 3.

The process for assembling the aforesaid embodiment of the magnetic tape cassette will be described below.

Figure 2:
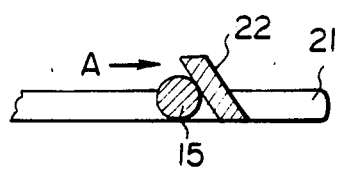
FIGS. 2 and 3 are schematic explanatory views showing the steps of mounting the guard panel on the cassette case.

The cassette case having the upper half 1a superposed on the lower half 1b and conveyed to the guard panel mounting station is set to the condition in which the upper half 1a is separated from the lower half 1b. In this condition, the supporting shafts 9 of the outer cover 5 are fitted into the semicircular holes 11, 11 of the upper half 1a. At the same time, as shown in FIG. 2, each of the guide bosses 15, 15 of the inner cover 6 is pushed in the direction as indicated by the arrow A until it contacts the associated auxiliary guide ribs 22. Therefore, in this condition, the positions of the guide bosses 15, 15 and the upper half 1a with respect to each other do not change even when they are subjected to vibration.

Then, the lower half 1b is combined with the upper half 1a, and the supporting shafts 9, 9 of the outer cover 5 are supported in the holes 11 which are now formed into a circular shape by the upper half 1a and the lower half 1b. Also, the guide bosses 15, 15 of the inner cover 6 are moved along the auxiliary guide ribs 22, 22 into the open/close guide grooves 18, 18 of the lower half 1b, and thus slidably engaged with the open/close guide grooves 18, 18. Before the guard panel mounting process is started, the outer cover 5 and the inner cover 6 constituting the guard panel 4 are slidably combined with each other.

As the height of the auxiliary guide ribs 22, 22 (i.e. the length thereof in the vertical direction of the cassette 1) is increased, the strength against vibration during the assembling process becomes high. However, from the viewpoint of appearance after assembling, the height should preferably be adjusted to a necessary and sufficient value to suit the condition of the assembling process.

The auxiliary guide ribs 22, 22 are not limited to the flat shape.

What is claimed is:

1. A magnetic tape cassette comprising upper and lower case halves for housing a magnetic tape therein, and a guard panel swingably supported to cover the magnetic tape exposed at an aperture section formed at the front race of the case constituted by the upper and lower case halves, wherein said guard panel comprises an outer cover for covering the outer surface of said magnetic tape, said outer cover of said guard panel is approximately U-shaped and constituted by a front wall for covering the outer surface of said magnetic tape, and a pair of side walls extending normal to said front wall and rearwardly of ends of said front wall, and an inner cover having a guide boss on each of two side wall surfaces and supported on said outer cover for movement in synchronization with opening and closing of said outer cover to cover the inner surface of said magnetic tape when said outer cover is closed, said inner cover is approximately T-shaped and constituted by an upper wall for covering an upper side of said aperture section, and a leg wall for covering the inner surface of said magnetic tape, and said guide boss is projected from each of two side wall surfaces of said leg wall, said lower half is provided with an inner cover open/close guide groove formed for slide engagement with said guide boss and extending approximately vertically at each of inner wall sections of tape pull-out holes formed at opposite ends of said aperture section, and said upper half is provided with an auxillary guide rib formed as a guide wall extending upwardly from an upper end of a front side edge of said open/close guide groove when said upper half is combined with said lower half to constitute said case, wherein said auxillary guide rib of said upper half is adapted to contact and hold said guide boss of said inner cover of said guide panel, and then guide said guide boss into said inner cover open/close guide groove of said lower half durring assembly of said magnetic tape cassette.

* * * * *